(12) United States Patent
Khalid

(10) Patent No.: US 6,789,879 B2
(45) Date of Patent: Sep. 14, 2004

(54) METHOD AND APPARATUS FOR PROCESSING DATA FOR HIGH-SPEED DIGITAL PRINTING

(75) Inventor: Najeeb Khalid, Westmount (CA)

(73) Assignee: Escher-Grad Technologies, Inc., Lachine (CA)

(*) Notice: Subject to any disclaimer, the term of this patent is extended or adjusted under 35 U.S.C. 154(b) by 0 days.

(21) Appl. No.: 10/366,469

(22) Filed: Feb. 14, 2003

(65) Prior Publication Data

US 2004/0160477 A1 Aug. 19, 2004

(51) Int. Cl.[7] .................................................. B41J 2/21
(52) U.S. Cl. ....................................................... 347/43
(58) Field of Search ...................... 347/15, 43; 358/1.9, 358/1.1

(56) References Cited

U.S. PATENT DOCUMENTS

| | | | |
|---|---|---|---|
| 4,882,621 A | 11/1989 | Suzuki et al. | 358/80 |
| 5,294,946 A | 3/1994 | Gandy et al. | 346/140 |
| 5,828,814 A | 10/1998 | Cyman et al. | 395/102 |
| 5,984,454 A | 11/1999 | Takahashi et al. | 347/43 |
| 6,089,695 A | 7/2000 | Takagi et al. | 347/40 |
| 6,120,129 A * | 9/2000 | Iwasaki et al. | 347/43 |
| 6,196,662 B1 | 3/2001 | Voelker et al. | 347/40 |
| 6,236,463 B1 | 5/2001 | Cyman et al. | 358/1.14 |
| 6,315,390 B1 | 11/2001 | Fujii et al. | 347/42 |
| 6,328,403 B1 * | 12/2001 | Iwasaki et al. | 347/15 |

OTHER PUBLICATIONS

Tiara printhead specification, Seiko Instruments Inc., online: <http://www.tiarasystems.com/printheads.html> (date accessed: Jul. 30, 2003).
"Frequently Asked Questions about Color", Charles Poynton, online: <http://www.poynton.com/PDFs/ColorFAQ.pdf> (date accessed:).
Ronald L. Bertolina, "Preflighting Digital Files", *SecondSight* No. 65 (Sewickley, PA: Graphic Arts Technical Foundation, 1997).

* cited by examiner

Primary Examiner—Thinh Nguyen
(74) Attorney, Agent, or Firm—Ogilvy Renault (57) ABSTRACT

An apparatus and method distributing data for high-speed digital printing on a printable material, includes a printer processor for receiving preflighted image data in a vector-oriented page description language, separating the color image data into a plurality of monochrome image data sets, and distributing the monochrome image data sets to respective print heads. Each print head raster image processes the monochrome images into bitmap images for printing on the printable material. A computational complexity of ripping the monochrome image data sets is reduced by preflighting, and distributed over the plurality of print heads to enable high speed printing.

29 Claims, 6 Drawing Sheets

METHOD AND APPARATUS FOR PROCESSING DATA FOR HIGH-SPEED DIGITAL PRINTING

CROSS-REFERENCE TO RELATED APPLICATIONS

This is the first application filed for the present invention.

TECHNICAL FIELD

This invention relates to digital printing and particularly to a method and apparatus for separating, rasterizing and distributing data for high-speed digital printing.

BACKGROUND OF THE INVENTION

Advances in ink-jet module technology have enabled the high-speed printing of continuously varying images containing a mixture of text of different fonts and image files of various formats. For example, applicant has developed ink-jet modules that permit full-color (such as cyan, magenta, yellow, and black (CMYK)), high resolution (360 dots per inch (dpi)), and full page width (11.33 inches) images to be printed at high speed, as is explained in co-pending U.S. Patent Application Serial No. 10/366,514 entitled "APPARATUS FOR ALIGNMENT OF MULTIPLE PAGE-WIDE ARRAY PRINT HEADS", which is incorporated herein by reference. However, a problem arises in processing image data at rates required to sustain the high speed printing. For example a steady bit rate of about 3.84 Gbps is required for dual-sided 4-color printing of 360 dpi.

Using the fastest available computers, processing of heterogeneous image data at this rate is not possible in most of today's affordable computers. While some mainframe computers may be able to provide this processing the expense of such computers is considerable. There therefore exists a need for an apparatus and method for processing electronic image data to ink-jet modules to enable high-speed printing.

SUMMARY OF THE INVENTION

It is an object of the invention to provide a printer and a method for processing image data to ink-jet modules for high-speed printing.

Accordingly, a printing apparatus is provided for printing an image on a printable material. The printing apparatus includes a computer for receiving image data in a format for printing, and preflighting the image data to limit a computational complexity of raster image processing (ripping) required to convert the image data to a bitmap image. A printer processor in communications with the computer is adapted to separate the image data into a plurality of monochrome image data sets and distributing the monochrome image data sets to respective print heads of the printing apparatus. Each of the print heads includes a raster image processor for ripping the monochrome image data sets to form bitmap image data sets. As each print head processor only rips a respective monochrome image, and the computational complexity of the monochrome image data set is bounded by the preflighting, data of variable content can be reliably received at the ink jet modules in a timely manner.

The preflighting may use software for detecting any of the following potential problems: a missing font; a broken link; a color out of bounds of a predetermined color palette; an extraneous element; incorrect trapping; incorrect bleeds; and a number fonts having resolutions that differ from that of the print heads in a page in excess of an empirically derived threshold. If a potential problem is detected, the preflight software applies an associated remedial procedure to the image data. Preferably, if an excessive number of fonts having differing resolutions are detected, the associated step of applying remedial procedures comprises a step of renormalizing the resolutions of the fonts to reduce computational complexity of ripping.

Each of the print heads preferably further comprises a plurality of ink-jet modules arranged in at least first and second staggered rows to provide an evenly spaced collection of print lines across a width of the printable material. Each of the first and second rows may comprise complementary pairs of ink-jet modules that are spaced apart in a direction of travel of the printable material, the complementary pairs of the ink-jet modules in the respective rows, the modules in each of the complementary pairs being offset from each other by one-half of a dot spacing of the ink-jet modules in a direction perpendicular to the motion of the printable material within the plane of the printable material, in order to double the print resolution of the printer. Analogous arrangements of multiple rows providing for higher resolutions are possible.

Preferably each of the print heads further comprises a print-strip data distributor for dividing the bitmap image data into a plurality of print-strip data sets that correspond to respective print areas printed by respective ones of the complementary pairs of ink-jet modules. Dot distributors may therefore be required for receiving respective ones of the print-strip data sets, separating the respective print-strip data sets into odd dot data and even dot data, and sending the respective odd dot data set and even dot data set to associated ink-jet modules of the respective pairs of print heads.

In accordance with one embodiment of the invention, the raster image processor, print-strip distributor and dot distributors of each of the print heads can be embodied by a special purpose computer.

The printing apparatus may include a first plurality of print heads for printing a first side of the printable material and a second plurality of print heads for printing a second side of the printable material.

Preferably the printable material is a continuous web, and the printing apparatus further comprises feed mechanisms for moving the continuous web past the first and second plurality of print heads. The printing apparatus may further comprise a cutter for cutting the continuous web into printed sheets, and may further include a stacker for stacking the printed sheets.

A method for processing color image data for high-speed digital printing is also provided. The method involves receiving preflighted image data from a computer print manager, separating image data into a plurality of monochrome image data sets, and distributing the monochrome image data sets to respective print heads. At the print heads, the monochrome image data sets are ripped to form bitmap image data sets, that are used to drive ink-jet modules to print the monochrome color image at each print head so that the monochrome color images are seamlessly overlaid to form the desired image.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
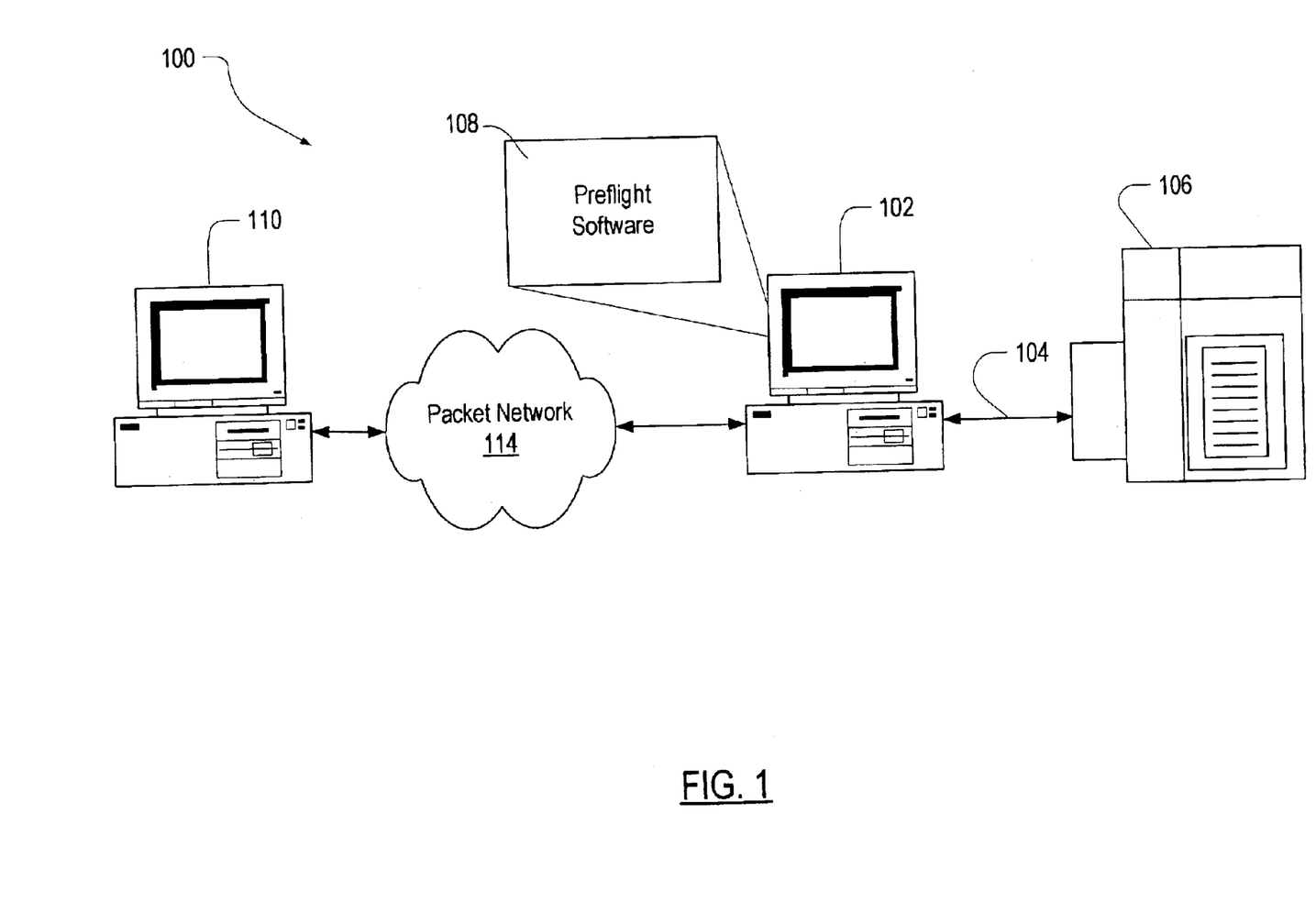
FIG. 1 is a schematic diagram of a printing apparatus in accordance with the invention connected to a computer.

FIG. 1 is a schematic diagram 100 of a computer 102 connected by a communications link 104 to a printing apparatus 106 in accordance with the invention. The communications link 104 may be a computer network such as an Ethernet; a serial connection such as a universal serial bus (USB) or IEEE 1394; a parallel port connection; or a wireless connection such as Bluetooth or IEEE 802.11b. The computer 102 preferably includes a print manager. A plurality of remote computers 110 (only one shown) may also be communicatively coupled to the computer 102 via a data packet network 114 such as the Internet or an Ethernet. Digital image data may be transferred from the remote computer 110 via the network 114 to the print manager in the computer 102, or may originate in the computer 102. The images are preferably in a vector-oriented page description language such as Postscript (.ps), Acrobat (portable document format), printer control language (PCL), advanced function presentation (AFP), etc. Hereafter the term "vector image" data will be used to refer to image data received from the computer 102 that is not necessarily raster image data processed to form a bitmap representation, but can be converted into such.

In accordance with the invention, the computer 102 runs print management software for controlling data flow to the printing apparatus 106. Further, preflight software 108 provides initial checks of the image data, in an effort to limit the computational complexity of raster image processing (ripping) required later on to convert the image data to a bitmap image. The preflight software ensures that the printer receiving the image data will have all of the data required to interpret it, and that the number of fonts and resolutions are within an empirically determined threshold. Accordingly the preflight software will perform such checks as determining if any of the following issues will arise at raster image processing time: a font is missing; a link is broken; a color is out of bounds with respect to a predetermined color palette of the printing apparatus; an extraneous element is present; trapping is incorrect; incorrect bleeds will be present; and the number of fonts in a page having resolutions that differ from that of the print heads is in excess of an empirically derived threshold. Each of these identified problems is handled offline by respective remedial procedures, using a set of procedures that are performed before the printing commences. For example, if the imaging components of a page of the imaging data have too many different resolutions, ripping the imaging data may require much more computation than allowed by the timing requirement of the print heads, in relation to the required print quality. Consequently an off-line process of renormalizing the data is performed. For present purposes, renormalizing is a computationally expensive procedure for converting a resolution of an image from a received resolution, to that of the printing apparatus 106. Algorithms for renormalization are known in the art and depend on the font, vector format, etc.

Figure 2:
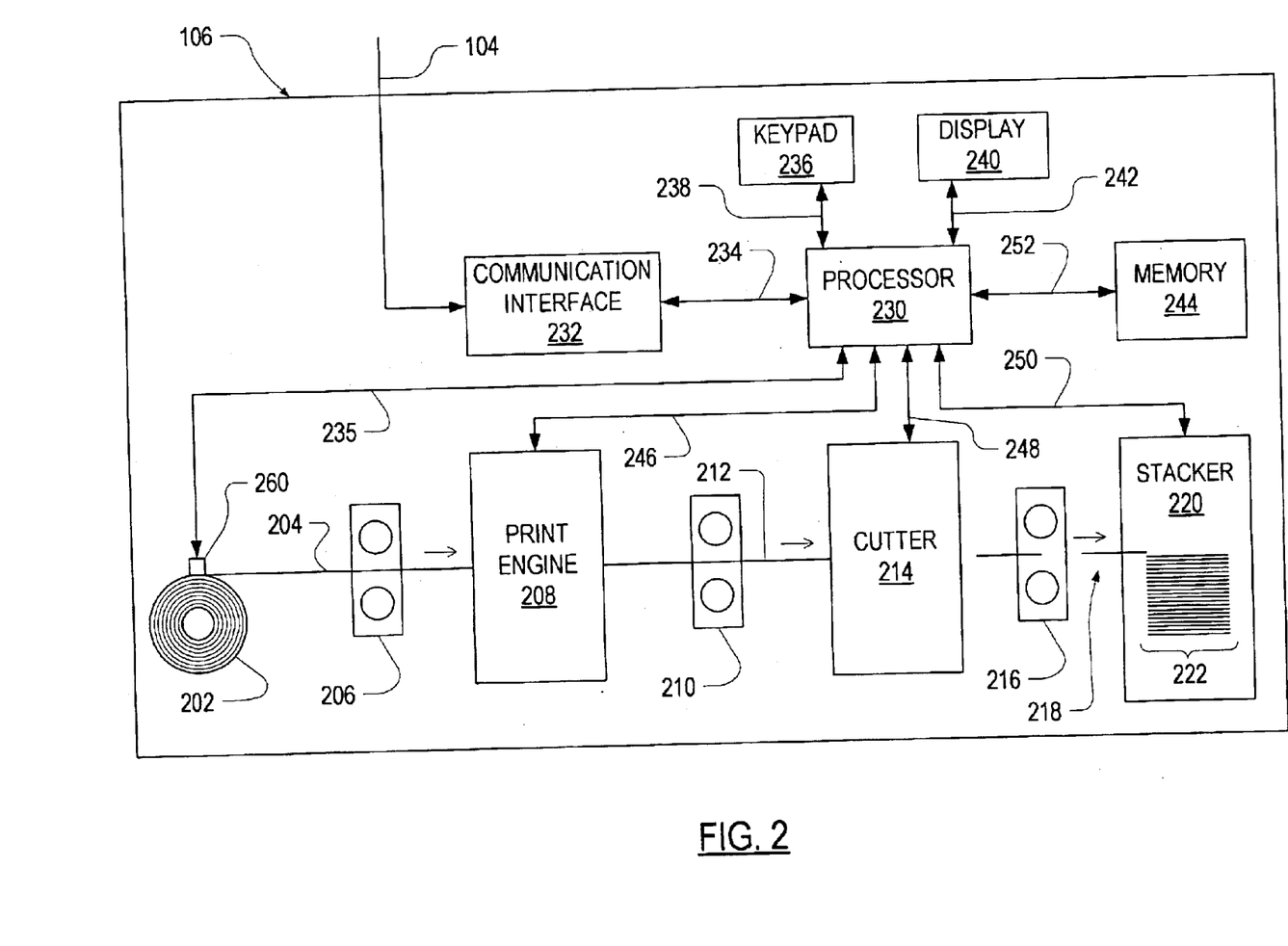
FIG. 2 is a block diagram of the printing apparatus shown in FIG. 1.

FIG. 2 is a block diagram of the printing apparatus 106 shown in FIG. 1. The printing apparatus 106 is provided with a source of printable material 204 which is preferably a web 202. The printable material 204 may be, for example, paper, plastic film, metal foil, cloth or a layer of any of the above. The printer also includes a first feed mechanism 206 for feeding the printable material 204 from the web 202 to a print engine 208, which may be an ink-jet print engine, for example.

The print engine 208 receives the vector image data and prints the represented image onto the printable material 204, which may be, for example, two or three dimensional images; holographic images; text; or any combination thereof. The print engine 208 may print on both sides of the printable material 204 to produce printed material 212 as described below. The printing apparatus 106 has a second feed mechanism 210 for feeding the printed material 212 from the print engine 208 to a cutter 214.

The cutter 214 cuts the printed material 212 into pages 218 of one of a predefined set of sizes. The cutter 214 may be, for example, a blade, a laser or a shearing mechanism. The printer 106 also has a third feed mechanism 216 for feeding the sheets 218 from the cutter 214 to a stacker 220.

The stacker 220 is adapted to lay the pages 218 on a stack 222. The stacker 220 may be, for example, a mechanism for sorting and/or collating documents; or a tray for receiving pre-sorted/pre-collated documents.

An embodiment of the printing apparatus 106 includes a processor 230 coupled by a connection 235 to a sensor 260 for sensing a condition of the web 202, such as a "source empty" condition. The processor 230 is also coupled by a connection 246 to the print engine 208 for conveying the vector image data to the print engine 208. The processor 230 is likewise coupled by a connection 248 to the cutter 214 for controlling the cutter 214, to cut the printed material 212 into sheets 218 of a required length. The processor is also coupled by a connection 250 to the stacker 220 for controlling the stacker 220 and sensing a condition of the stacker 220 such as an "output tray full" condition.

The printing apparatus 106 also includes a communications interface 232 coupled by a connection 234 to the processor 230, and adapted to communicate with the computer 102 (FIG. 1) via the communications link 104. The processor 230 is also coupled by a connection 238 to a keypad 236 to permit a user (not shown) to input commands to the processor 230, and coupled to a display 240 by a connection 242 to permit the processor 230 to display printer status information messages generated by the processor 230. The processor 230 is also coupled to a memory 244 by a memory bus 252.

Figure 3:
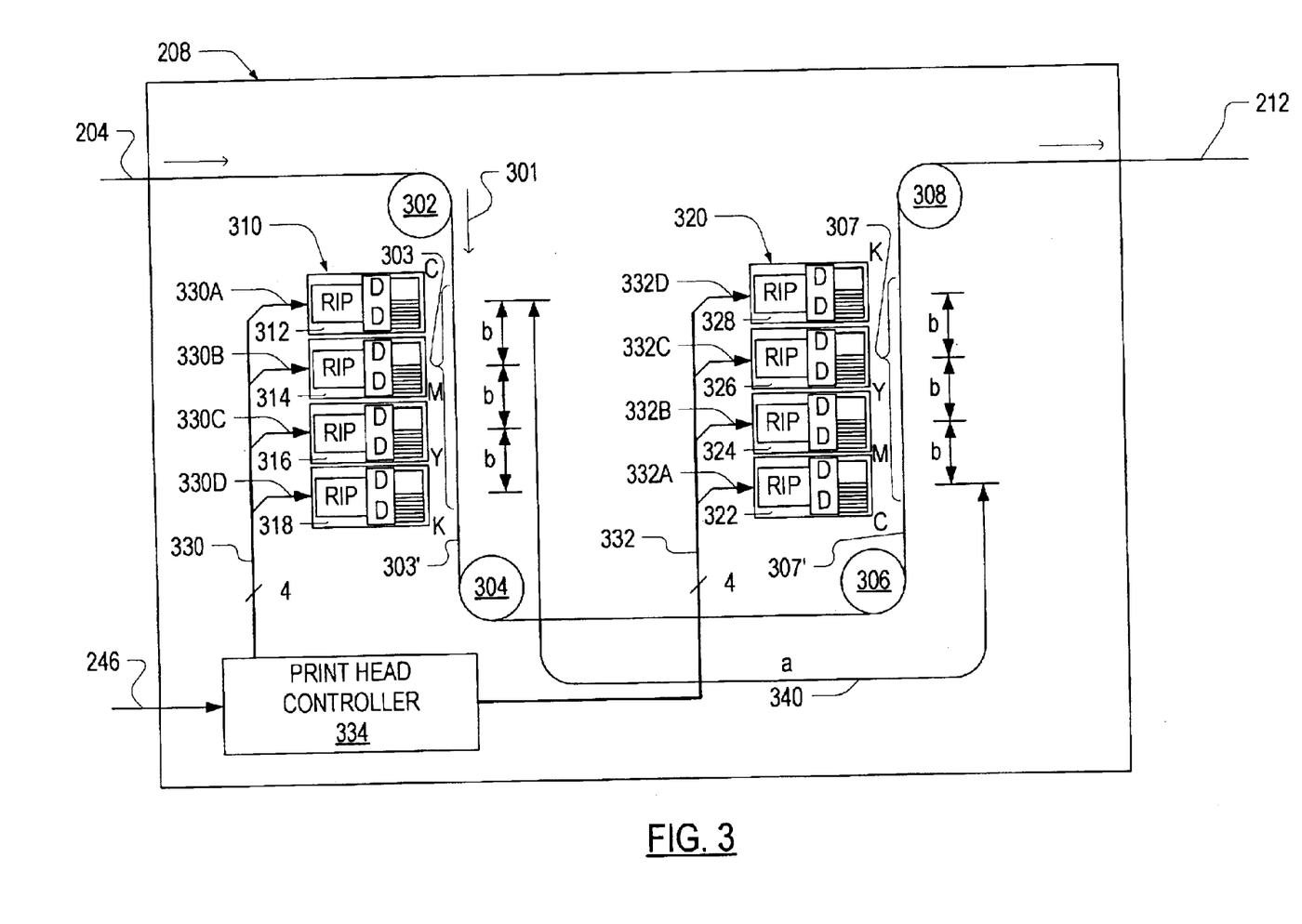
FIG. 3 is a schematic diagram of a print engine shown in FIG. 2.

FIG. 3 is a block diagram of an embodiment of the print engine 208 shown in FIG. 2. The print engine 208 includes a first guide 302 that provides a first bend to redirect the printable material 204 with respect to a bottom sense of the printable material, a second guide 304 providing a second bend that redirects the printable material 204 with respect to a top sense of the printable material, a third guide 306 that provides a third bend that redirects the printable material 204 with respect to the top sense, and a fourth guide 308 that provides a fourth bend that redirects the printable material 204 with respect to the bottom sense.

The print engine 208 includes a first plurality of print heads 310 for printing in a first printing area 303 between the first guide 302 and the second guide 304 on a first side 303' of the printable material 204. In one embodiment, the first plurality of print heads 310 are ink-jet print heads for printing cyan 312, magenta 314, yellow 316, and black 318 (CMYK). All of the ink-jet print heads 312,314,316,318 are identical except for a source of ink (not shown), in order to facilitate maintenance. Alternatively, the first plurality of print heads 310 may include print heads adapted for any other subtractive color system, for example: a cyan, light cyan, magenta, light magenta, yellow, and black ($C_2M_2YK$) color system. High density black and white images may also be provided by a system of the invention by replacing the colors with only black ink modules.

In the embodiment shown in FIG. 3, the first plurality of print heads 310 are arranged in a horizontal stack parallel to each other and squarely facing the printable material 301 within the first print area 303. Each of the print heads 310 is vertically offset a distance b 342 from print heads immediately above and/or below. It should be noted that the first plurality of print heads 310 are shown arranged in an order of cyan 312, magenta 314, yellow 316, and black 318. However, the order in which the print heads 310 are arranged is not material to the invention.

The print engine 208 also includes a second plurality of print heads 320 for printing in a second print area 307 between the third guide 306 and the fourth guide 308 on a second side 307' of the printable material 204. The second set of print heads 320 is substantially identical to the first set of print heads 310 and the print heads are arranged in a same order with respect to a direction of travel of the printable material 204. The second plurality of print heads 320 is positioned such that each of the print heads 322, 324, 326, 328 of the second plurality of print heads 320 is offset a distance "a" from a respective corresponding print head 312, 314, 316, 318 of the first plurality of print heads 310.

The print engine 208 includes a print head controller 334 (FIG. 4) for receiving the vector image data from the processor 230 (FIG. 2) and distributing the data to the first plurality of print heads 310 and the second plurality of print heads 320 via a first bus 330 and a second bus 332, respectively. The buses 330, 332 are preferably high-speed Ethernet buses such as 100 base-t. In this embodiment, images of the odd pages are printed on the first side 303' of the printable material 204 and images of the even pages are printed on the second side 307' of the printable material 204. In this embodiment, the vector image data is preflighted; i.e., the vector image data undergoes an extensive list of checks for such potential problems as: missing fonts, broken links, colors out of bounds of a color palette, extraneous elements, incorrect trapping, incorrect bleeds, and estimation of a maximum time required for raster image processing (ripping). The pre-flight may be executed on the computer 102 (FIG. 2), although alternatively it could be performed on the remote computer 110.(FIG. 1). The image data must pass each of the pre-flight checks before being received by the print head controller 334.

The vector image data received via the connection 246 (FIG. 4) is separated into odd page image data 404 and even page image data 420 by a page separator 402. The even page image data 420 is delayed by a delay circuit 422 for a time that is takes the printable material 204 to travel the distance a, so that the odd pages and the even pages appear at corresponding locations on opposite sides of the printable material 204. The odd page image data 404 is separated into four data sets of primary color vector image data: cyan, magenta, yellow, and black, by a color separator 406, each of which is output to the bus 330. The cyan image data is sent over bus 330A to the cyan print head 312. The magenta image data is delayed by a delay circuit 410 by a time that it takes for the printable material 204 to travel a distance b, before being output over the bus 330B. The yellow image data is delayed for a time required for the printable material to travel a distance 2b 342 by a delay circuit 414, which outputs delayed yellow image data 330C. The black image data is delayed by a time that it takes the printable material 204 to travel the distance 3b by a delay circuit 418, which outputs delayed black image data 330D. In an identical manner, the delayed even page image data 424 is separated to produce cyan image data (sent over bus 332A), delayed magenta image data (sent over bus 332B), delayed yellow image data (sent over bus 332C), and delayed black image data (sent over bus 332D). Each of the delay circuits 410, 414, 418, 422, 432, 436, 440 can be implemented using a circular buffer, fist-in-first-out (FIFO) buffer, or the like, using design techniques that are known to those skilled in the art. The page separator 402 and color separator 406 can be implemented using a programmable micro-controller, an application specific integrated circuit (ASIC), a field programmable gate array (FPGA), or the like, using design techniques that are likewise well known to those skilled in the art.

Figure 5:
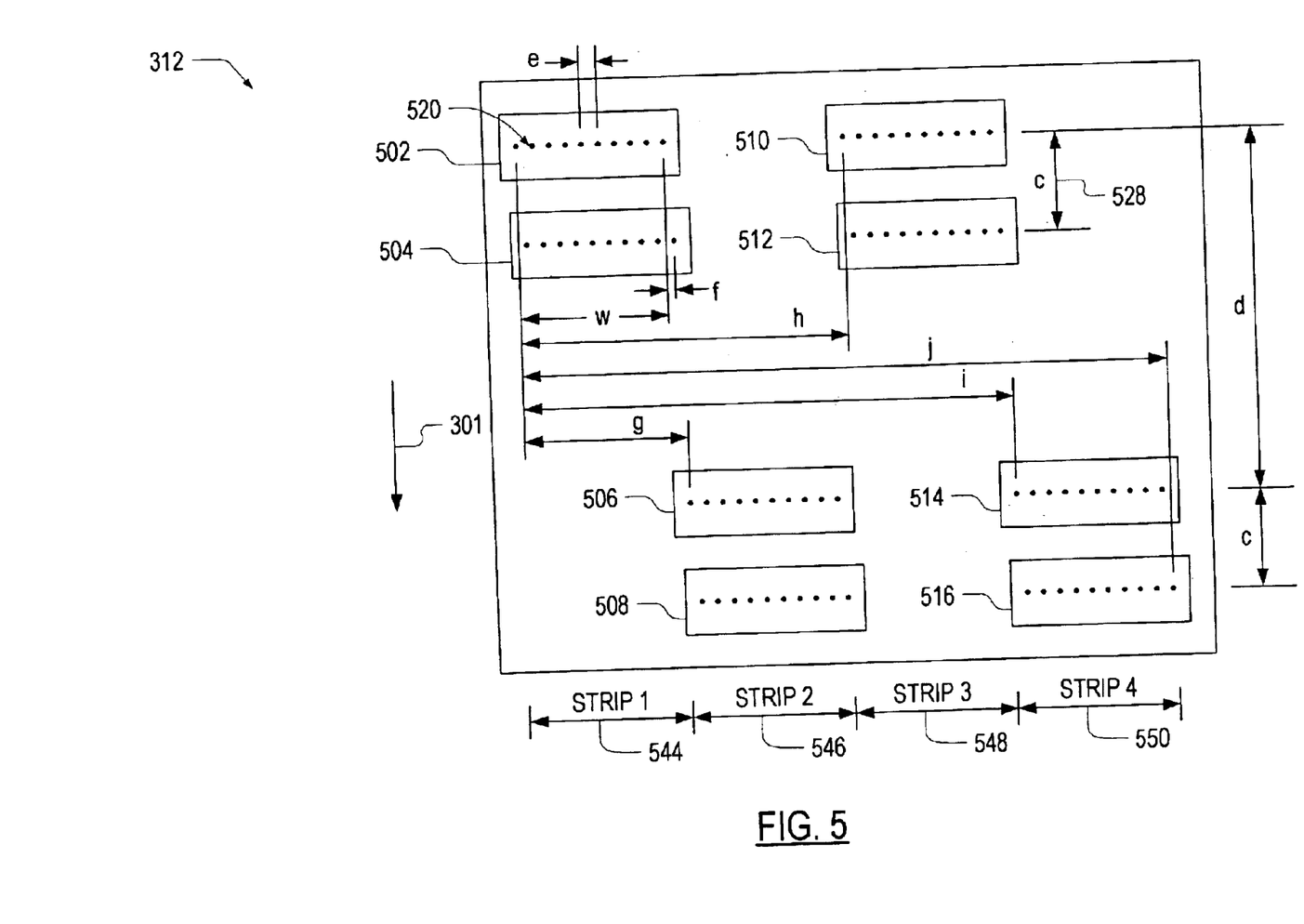
FIG. 5 is a schematic diagram of a print head shown in FIG. 3.

An arrangement, in accordance with the invention, of the cyan print head 312 shown in FIG. 3 will now be described with reference to FIG. 5. As stated above, the cyan print head 312, the magenta print head 314, the yellow print head 316, and the black print head 318 are identical. The cyan print head 312 includes eight ink-jet modules 502, 504, 506, 508, 510, 512, 514, 516, each having a plurality of ink-jet nozzles 520. The ink-jet nozzles 520 are vertically spaced apart by a distance "e". In a present embodiment there are 510 nozzles per ink-jet module (only ten are shown for clarity) having a pitch of 180 nozzles per inch, a total width of the nozzles being w, which equals the number of nozzles minus 1 horizontal inter-nozzle distance (i.e. 25/6 inches). The dimension of the ink-jet module is marginally greater than w.

The ink-jet modules are arranged in a first row and a second row. Both the first row and the second row includes complementary pairs of ink-jet modules that are vertically and horizontally offset. The first module 502 and the second module 504 of the first complementary pair in the first row are vertically offset by a distance "c", in a direction parallel to the distance of motion 301 of the printable material 204. The first module 502 and the second module 504 are also horizontally offset by a distance "f", in the direction perpendicular to the motion of the printable material 204 in the plane of the printable material 204. The distance f is equal to one half of the distance e, in order to double the dpi of the printer and improve resolution of the printed images. The first module 502 and second module 504 print a first print-strip 544 on the printable material 204.

The first module 506 and the second module 508 in the second row are positioned relative to each other in the same way as the first module 502 and the second module 504 in the first row. The module 506 is vertically offset by a distance "d" in a direction that is parallel to the motion of the printable material, and offset a distance "g" from the first module 502 in a direction that is perpendicular to the motion of the printable material 301 in the plane of the printable material 204. The distance g is equal to w+ e. The module 506 and the module 508 print a second print-strip 546 on the printable material 204.

The module 510 and the module 512, in the first row are positioned relative to each other in the same way as the first module 502 and the second module 504, respectively. The module 510 is horizontally offset a distance "h" from the first module 502. The distance h is equal to 2w+2e. The module 510 and module 512 print a third print-strip 548 on the printable material 204.

The module 514 and the module 516, in the second row are positioned relative to each other in the same way as the first module 502 and the second module 504, respectively. The seventh module 514 is vertically offset by the distance "d" parallel to the motion of the printable material, and horizontally offset by a distance "i" from the first module 502. The distance i is equal to 3w+3e. The module 514 and module 516 print a fourth print-strip 550 on the printable material 204.

In the present embodiment an active printing width "j" of the cyan print head 312 is equal to the total number of nozzles (8×510=4080) minus 1 divided by a horizontal inter-nozzle distance (4079/360=11.33 inches plus a width of the nozzles). The printable material 204 may move at a speed of 35.4 inches/second so that for nozzles 520 having a maximum firing frequency of 12.8 kHz, a print resolution in the direction of the motion of the printable material 204 of 360 dpi is obtained. Other speeds of the printable material 204 may be used to achieve different vertical resolutions.

Figure 6:
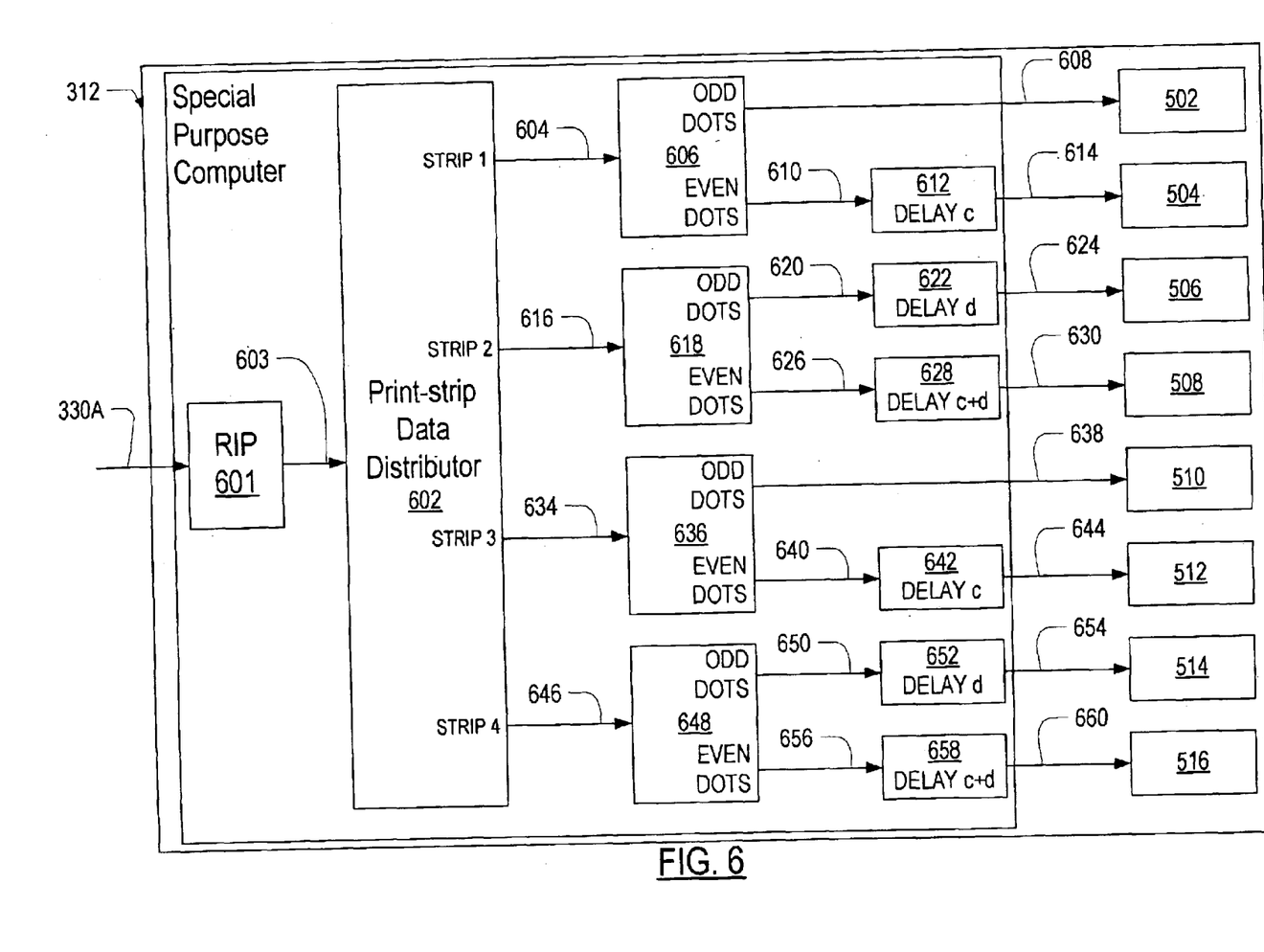
FIG. 6 is a schematic diagram of a distribution of data in accordance with the invention within the print head shown in FIG. 3.

As shown in FIG. 6, the cyan print head 312 receives the monochrome cyan vector image data over bus 330A. A raster image processor 601 raster image processes (rips) the monochrome cyan vector image data into a bitmap image data 603. A print-strip data distributor 602 is adapted to control printing by the cyan print head 312 shown in FIG. 5. The bitmap image 603 is divided into four image print-strip data sets: a first print-strip data set 604, a second print-strip data set 616, a third print-strip data set 634, and a fourth print-strip data set 646 by a print-strip data set distributor 602. In this embodiment, the cyan image data received on bus 330A is received in 4080 bits per row, and has a resolution of 360 dpi, matching the active printing width j. Each image print-strip data set 604, 616, 634, 646 is 1020 bits per printed row. The print-strip data distributor 602 can be implemented using hardwired logic, programmable logic, an ASIC, an FPGA, or the like using design techniques well known to those skilled in the art.

Note that by separating the color vector image data received by the print head controller 334 into eight monochrome image data sets 330A–330D and 332A–332D (FIG. 3) and using eight corresponding raster image processors 601 to process the monochrome vector images within each print head 312–328 instead of raster image processing the color vector image at the printer processor 230 or computer 102, the bit rate of data distributed from the printer processor 230 to the print heads 310, 320 is substantially reduced, resulting in a feasible arrangement for processing the data using relatively inexpensive commercially available processors.

Each print-strip data set 544–550 (FIG. 5) is further divided into respective odd dot data sets 608, 620, 638, 650 and even dots 610, 626, 640, 656 by a respective dot distributor 606, 618, 636, 648. In this embodiment there are 510 odd dots and 510 even dots per print strip. The dot distributors 606, 618, 636, 648 can be realized using hardwired logic, programmable logic, an ASIC, an FPGA, or the like, using design techniques well known to those skilled in the art.

The odd dots for the first print strip 608 are printed by the first ink-jet module 502. The even dots of the first print-strip data set 610 are delayed by a delay circuit 612 for a time that it takes the printable material 204 to travel the distance c. The delay circuit 612 outputs a delayed set of even dot data 614 that is printed by the second-ink-jet module 504. The odd dots of the second print-strip data set 620 are delayed by a delay circuit 622 for a time that it takes for the printable material 204 to travel the distance d. The delay circuit 622 outputs a delayed set of odd dot data 624 that is printed by the third ink-jet module 506. The even dot data of the second print-strip data set 626 are delayed by a delay circuit 628 for a time required for the printable material 204 to travel the distance c plus d. The delay circuit 628 outputs a delayed set of even dot data 630 that is printed by the fourth ink-jet module 508. In a manner identical to that described above with reference to the first print-strip data set 604, print data for the third print strip 634 is distributed for printing by the ink-jet module 510 and the ink-jet module 512. In a manner identical to that of the second print strip 616, a print-strip data set for the fourth print strip 646 is distributed for printing by the ink-jet module 514 and the ink-jet module 516. Each of the delay circuits 612, 622, 628, 642, 652, 658 can be implemented using circular buffers, fist-in-first-out (FIFO) buffers, or the like using design techniques known to those skilled in the art.

Preferably the raster image processor (RIP) 601, print-strip data distributor 602, and dot distributors 606, 618, 636, 648 are all embodied on a single special purpose computer that is a part of the print head. The delay circuits 612, 622, 628, 642, 652, 658 may be a part of the special purpose computer, may be effected with circuit/bus means interconnecting the special purpose computer and the ink-jet modules, or may further be embodied by a combination of both.

Figure 4:
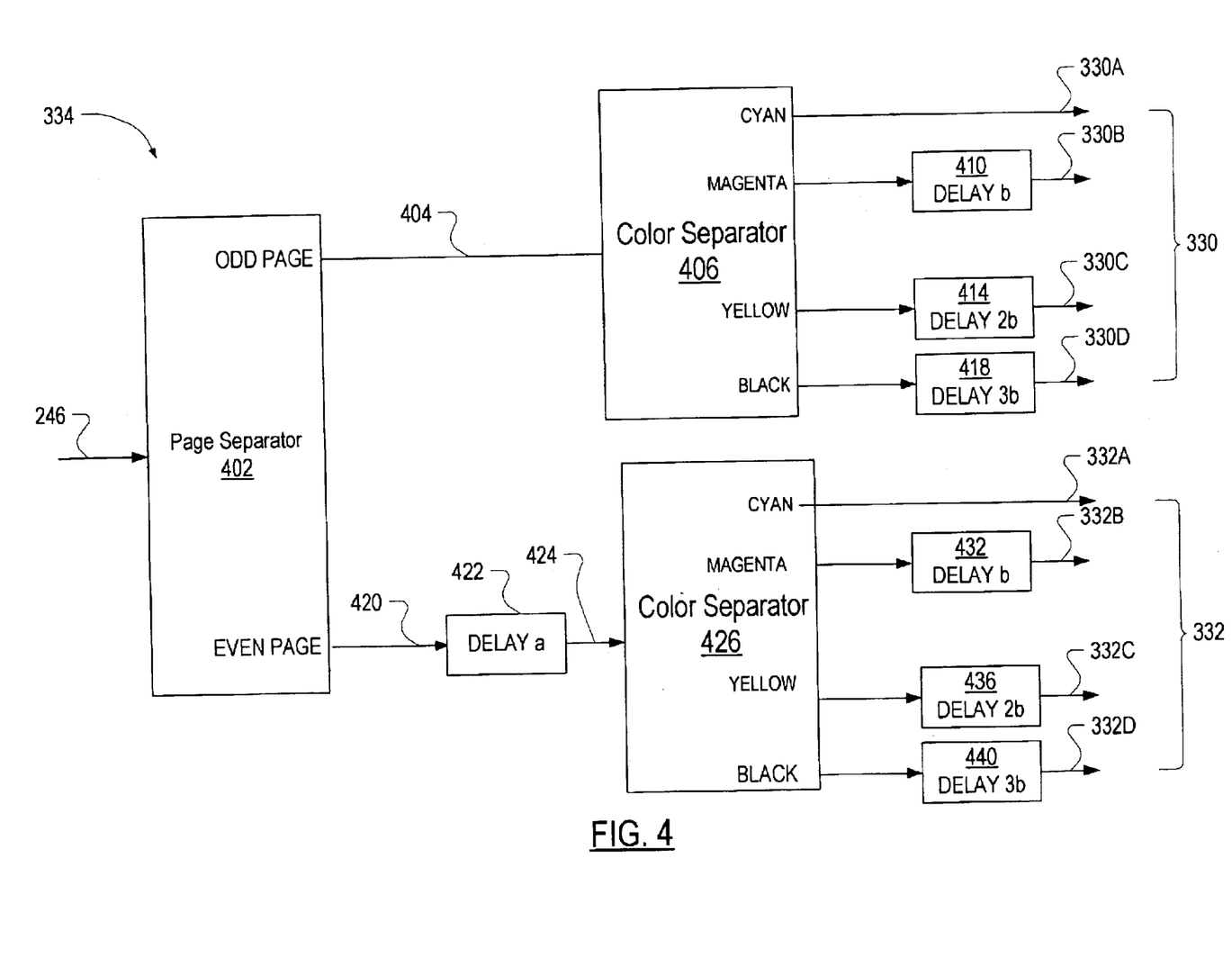
FIG. 4 is a schematic diagram illustrating distribution of data in accordance with the invention within a print head controller shown in FIG. 3.

It should be noted that the time delay of corresponding delay circuits 422, 410, 414, 416, 432, 436, 440 shown in FIG. 4 may not be exactly as defined. Rather the delay introduced by each circuit is a nominal delay that includes intrinsic delays that occur in the page separator 402, and color separators 406, 426. Similarly, the delay elements 612, 622, 628, 642, 652, 658 shown in FIG. 6 are likewise simplified. The delay introduced by each element is a nominal delay that includes intrinsic delays introduced by the RIP 601, print-strip data distributor 602, and dot distributors 606, 618, 636, 648.

The invention therefore provides a printing apparatus and method for distribution of data for digital printing of continuously variable images that are full-color, high-resolution, and full page width, such that a bit rate of data distribution to the print heads 312–328 supports high-speed printing.

It should be noted that although the processor 230 and print head controller 334 have been illustrated as separate elements, in alternative embodiments of the invention a single processor subsumes functionality of both of these and is provisioned accordingly.

The embodiments of the invention described above are intended to be exemplary only. The scope of the invention is therefore intended to be limited solely by the scope of the appended claims.

I claim:

1. A printing apparatus for printing an image represented by image data onto printable medium, comprising:
    a plurality of monochrome print heads, each comprising a plurality of print modules;
    a first processor adapted to separate the image data into monochrome image data sets and distributing them to respective print heads; and a second processor associated with each print head and adapted to generate bitmap image data and distribute subsets thereof to respective print modules, each having an array of nozzles;

whereby the bitmap image data subsets may be printed onto the printable media to generate the image to be printed.

2. A printing apparatus according to claim 1, further comprising a preprocessor for preflighting the image data to limit the computation complexity required by the first and second processors.

3. A printing apparatus according to claim 2, wherein the preprocessor detects an error condition and applies remedial procedures to correct errors that are detected.

4. A printing apparatus according to claim 1, wherein the apparatus is adapted to accept a printable medium that moves along one dimension thereof relative to the apparatus.

5. A printing apparatus according to claim 4, wherein the print modules in a print head are divided into groups, each group corresponding to a geographical portion of the area to be printed in the printable medium.

6. A printing apparatus according to claim 5, wherein the geographical portion represent strips in a direction perpendicular to the direction of motion of the printable medium.

7. A printing apparatus according to claim 6, wherein the print modules in a group are offset from each other.

8. A printing apparatus according to claim 7, wherein the offset between the print modules in a group is or a fraction of the inter-nozzle distance in a direction perpendicular to the direction of motion of the printable medium.

9. A printing apparatus according to claim 7, wherein the offset between print modules in a group is in a direction parallel to the direction of motion of the printable medium.

10. A printing apparatus according to claim 9, wherein the second processor is adapted to accommodate the offset between print nozzles in a group by introducing respective delays in the bitmap image data stream transmitted to them.

11. A printing apparatus according to claim 4, wherein the print heads are offset in a direction parallel to the direction of motion of the printable medium.

12. A printing apparatus according to claim 11, wherein the first processor is adapted to accommodate the offset between print heads by introducing respective delays in the monochrome image data sets transmitted to them.

13. A printing apparatus according to claim 4, further comprising a third processor adapted to separate image data corresponding to a first page image and to a second page image to be printed overleaf from the first page image and distributing them to respective first processors.

14. A printing apparatus according to claim 13, wherein the third processor is adapted to introduce a delay in the image data corresponding to the second page image.

15. A method for processing image data for printing on a printable medium, comprising the steps of:

receiving the image data;

separating the image data into a plurality of monochrome image data sets;

distributing the monochrome image data sets to respective color print heads;

raster processing the monochrome image data sets to generate bitmap image data sets;

allocating the bitmap image data sets to respective print modules with the print heads; and printing the bitmap image data sets onto the printable medium.

16. A method as claimed in claim 15, wherein the step of receiving is followed by the additional step of preprocessing the image data to limit the computational complexity otherwise required in the separating and raster processing steps.

17. A method as claimed in claim 16, wherein the step of pre-processing comprises the steps of:

identifying an error condition; and applying remedial procedure to correct detected errors.

18. A method according to claim 17, wherein the error condition is a missing font.

19. A method according to claim 17, wherein the error condition is a broken link.

20. A method according to claim 17, wherein the error condition is a color out of bounds of a color palette.

21. A method according to claim 17, wherein the error condition is an extraneous element.

22. A method according to claim 17, wherein the error condition is incorrect trapping.

23. A method according to claim 17, wherein the error condition is incorrect bleed.

24. A method according to claim 17, wherein the error condition is an excess of fount that have a resolution different from that of the print heads with a page.

25. A method according to claim 24, wherein the remedial procedure is to renormalize the font resolutions.

26. A method as claimed in claim 15, wherein the step of receiving is followed by the additional step of allocating the image data into page data sets corresponding to even and odd page sets respectively.

27. A method as claimed in claim 15, wherein the step of separating comprises applying an additive color system algorithm.

28. A method as claimed in claim 15, wherein the step of separating comprises applying a subtractive color system algorithm.

29. A method as claimed in claim 15, wherein the step of allocating comprises dividing the bitmap data into geographical regions and allocating one or more print modules to print the bitmap data for a geographical region.

* * * * *